US010762153B2

(12) United States Patent
Puri et al.

(10) Patent No.: US 10,762,153 B2
(45) Date of Patent: Sep. 1, 2020

(54) COLLABORATIVE-FILTERED CONTENT RECOMMENDATIONS WITH JUSTIFICATION IN REAL-TIME

(71) Applicant: Adobe Inc., San Jose, CA (US)

(72) Inventors: Nikaash Puri, New Delhi (IN); Piyush Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 252 days.

(21) Appl. No.: 15/823,331

(22) Filed: Nov. 27, 2017

(65) Prior Publication Data

US 2019/0163829 A1    May 30, 2019

(51) Int. Cl.
*G06F 16/9535* (2019.01)
*G06Q 30/02* (2012.01)
*G06F 16/9536* (2019.01)
*H04L 29/08* (2006.01)

(52) U.S. Cl.
CPC ...... *G06F 16/9535* (2019.01); *G06F 16/9536* (2019.01); *G06Q 30/02* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 9,483,580 B2 * | 11/2016 | Franceschini | .......... | G06N 5/046 |
| 9,781,457 B1 * | 10/2017 | James | .................... | G06F 16/44 |
| 2008/0201287 A1 * | 8/2008 | Takeuchi | ............... | G06Q 30/08 |
| | | | | 706/46 |
| 2010/0169340 A1 * | 7/2010 | Kenedy | ................... | G06Q 30/02 |
| | | | | 707/758 |
| 2016/0180402 A1 * | 6/2016 | Sabah | ................... | G06F 16/285 |
| | | | | 705/14.66 |
| 2017/0048184 A1 * | 2/2017 | Lewis | ...................... | H04L 51/10 |
| 2017/0289594 A1 * | 10/2017 | James | ..................... | G06F 16/44 |
| 2018/0027296 A1 * | 1/2018 | Lea | ...................... | H04N 21/475 |
| | | | | 725/50 |
| 2018/0075137 A1 * | 3/2018 | Lifar | ..................... | G06F 16/337 |
| 2018/0109827 A1 * | 4/2018 | Fleck | ................... | H04N 21/251 |
| 2018/0276542 A1 * | 9/2018 | Cheng | ................ | G06Q 30/0241 |

\* cited by examiner

*Primary Examiner* — Mark D Featherstone
*Assistant Examiner* — Samuel C Sharpless, III
(74) *Attorney, Agent, or Firm* — SBMC

(57) ABSTRACT

Collaborative-filtered content recommendations with justification in real-time is described. A recommendation system determines these recommendations, in part, by identifying digital content items of a catalog that are associated with a single attribute used to describe digital content. The attribute used for the identification is based on affinity scores computed for a client device user to which the recommendations are being provided. These affinity scores indicate the client device user's affinity for different attributes used to describe the digital content. Once the digital content items are identified based on the one attribute, the recommendation system is then limited to ranking and selecting from the identified digital content items to provide the recommendations. The recommendation system does not process the entire catalog of digital content items at once to rank and select the items. Due to this, the described recommendation system performs less computing and is therefore faster than conventional recommendation systems.

20 Claims, 8 Drawing Sheets

COLLABORATIVE-FILTERED CONTENT RECOMMENDATIONS WITH JUSTIFICATION IN REAL-TIME

BACKGROUND

Advances in computing systems enable content to be produced easily and also to be distributed to end users through a variety of channels, e.g., different web sites, different applications on a variety of devices, and so on. As a result, the amount of content available to users is not only is staggeringly large, but also continues to grow. Given the amount of available content, users are unlikely to know about the entirety of this content. To this extent, recommendation systems provide digital content recommendations to users for items these systems predict the users will like. These recommendation systems provide digital content recommendations for a variety of items including, but not limited to, videos, music, audiobooks, e-books or periodicals, news articles, products or services, and so forth.

Broadly speaking, there are two types of conventional recommendation systems. The first type of recommendation systems are item-based. Item-based recommendation systems generally provide a same recommendation to different client device users that consume a same digital content item. For instance, if two different users view a same video, item-based recommendation systems recommend a same set of videos to watch next. This approach does not personalize recommendations, however. Typically, personalized recommendations lead to higher user engagement and retention than non-personalized recommendations. The second type of conventional systems, user-based recommendation systems, can provide personalized recommendations. In general, user-based recommendation systems learn a model for a given user's behavior, e.g., based on the given user's interaction history with digital content items, purchase history, and so forth. In particular, these user-based recommendation systems learn this model in the form of latent factors. While such latent factors capture some aspect of user behavior, the captured aspect is often computer, but not human, interpretable. Due to capturing aspects that are not human-interpretable, the recommendations of user-based systems cannot be provided with corresponding human-interpretable justifications that explain why the recommendations are provided. Though these recommendations recommend items that client device users may find more interesting than other items, if the recommendations are heeded, client device users may not be comfortable interacting with such recommendations because they lack corresponding justifications. Accordingly, client device users may not interact with recommendations provided using these conventional techniques.

SUMMARY

To overcome these problems, collaborative-filtered content recommendations with justification in real-time is leveraged in a digital medium environment. A recommendation system determines these recommendations, in part, by identifying digital content items of a catalog that are associated with a single attribute that is usable to describe digital content. The attribute used for the identification is based on affinity scores that are computed for a client device user to which the recommendations are being provided. These affinity scores indicate the client device user's affinity for different attributes that can be used to describe the digital content. Once the digital content items of the catalog are identified based on the one attribute, the recommendation system is then limited to ranking and selecting from the identified digital content items to provide the recommendations. The recommendation system does not process the entire catalog of digital content items at once to rank and select the items. Due to this, the described recommendation system performs less computing than conventional recommendation systems and is therefore able to provide recommendations faster than these systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
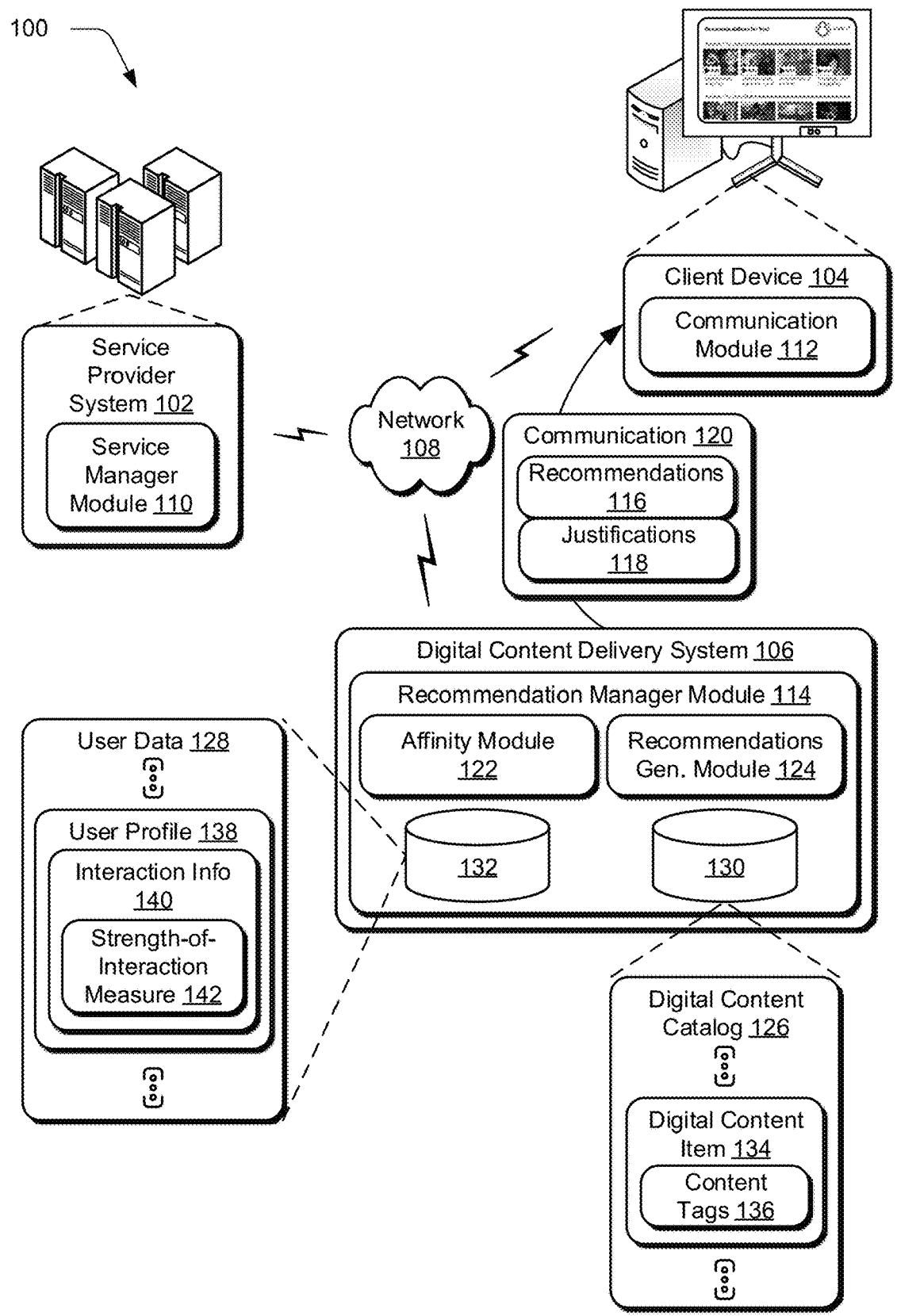
FIG. 1 is an illustration of an environment in an example implementation that is operable to employ techniques described herein.

As a result of advances in computing systems, the amount of content available to users is not only is staggeringly large, but also continues to grow. Given the amount of available content, users are unlikely to know about the entirety of this content. To this extent, recommendation systems provide digital content recommendations to users for items these systems predict the users will like. However, conventional recommendation systems suffer from a variety of drawbacks. One type of these systems, item-based recommendation systems, generally provide a same recommendation to different client device users that consume a same digital content item. Accordingly, this approach does not personalize recommendations, though personalized recommendations lead to higher user engagement and retention than non-personalized recommendations. Another type of these systems, user-based recommendation systems, provide personalized recommendations, but do so using latent factors that capture some aspect of user behavior, which is often computer, but not human, interpretable. Consequently, recommendations from this second type of system cannot be provided with corresponding human-interpretable justifications that explain why the recommendations are actually provided. Due to these drawbacks, client device users may not interact with recommendations provided using these conventional techniques.

To overcome these problems, collaborative-filtered content recommendations with justification in real-time is leveraged in a digital medium environment. In accordance with the described techniques, a recommendation system determines recommendations for a client device user, in part, by identifying digital content items of a catalog that are associated with a single attribute that can describe digital content. The attribute used for the identification is based on affinity scores computed for the client device user, e.g., the attribute having the highest affinity score. Broadly speaking, the affinity scores indicate the client device user's demonstrated affinity for different attributes that can be used to describe digital content. By way of example, attributes of videos may correspond to genres, e.g., comedy, action, drama, romance, and so on. Accordingly, affinity scores may be computed that indicate the client device user's affinity for comedy videos, action videos, drama videos, romance videos, and so forth. As discussed below, the attributes may describe a variety of characteristics of recommendable items without departing from the spirit or scope of the described techniques.

In any case, the recommendation system may initially compute affinity scores for a client device user based on interactions of the user with different content items. In one or more implementations, the recommendation system generates a matrix that plots client device users against digital content items of a content catalog. The recommendation system populates cells of this matrix with strength-of-interest measures for the digital content items the client device users have interacted with. These strength-of-interest measures represent a demonstrated interest of the client device users with a particular content item. A demonstrated interest may be explicit (e.g., user-provided ratings), or may be estimated (e.g., based on an amount of interaction time with the content item). In addition to this user-item matrix, the recommendation system generates a matrix that plots the digital content items against the different attributes that are used to describe the digital content. The recommendation system populates this matrix with indications (e.g., '1' or '0') that indicate whether a digital content item is associated with a given attribute (e.g., '1') or not (e.g., '0'). Based on these matrices, the recommendation system computes the affinity scores, as described in more detail below.

Given the affinity scores, the recommendation system is able to determine attributes of the digital content items in which a client device user demonstrates the most interest, e.g., the attributes corresponding to the highest affinity scores. Based on this knowledge, the recommendation system initially identifies the digital content items of the content catalog that are associated with one of the different attributes, such as the attribute corresponding to a highest affinity score of a client device user. Once the digital content items associated with this one attribute are identified, the recommendation system ranks the identified digital content items—the recommendation system is limited to ranking solely the identified content items. In so doing, the recommendation system avoids ranking the entire catalog of digital content items at once. The recommendation system then selects a subset of the digital content items to recommend to the client device user based on the ranking, e.g., the top-k digital content items. The recommendation system can repeat this identifying, ranking, and selecting for additional attributes—one attribute at a time—according to a request specifying a number of recommendations associated with a number of attributes.

In addition, the recommendation system generates justifications for recommended items based on the attribute used to identify them. Consider a scenario in which the recommendation system identifies digital content items that are associated with an 'Action' attribute, for instance, because affinity scores of a client device user indicate a demonstrated affinity for items associated with the 'Action' attribute. This may occur when the highest affinity score computed for the client device user corresponds to the 'Action' attribute. In this scenario, the recommendation system can generate a justification for the recommended items such as "Because you liked action items." Obviously, this is merely an example, and justifications can be generated to describe why a user is presented with recommendations in a variety of ways that indicate the attribute used to identify the recommended items. Regardless of the particular attribute used for the identification, the recommendation system provides a justification with the selected subset of content items based on the attribute used.

Accordingly, the described recommendation system supports several advantages. One advantage is that the recommendation system supports collaborative filtering to provide recommendations that are diverse, personalized for a particular client device user, and serendipitous. Additionally, the techniques deployed by the recommendation system enable the system to provide human-interpretable justifications explaining why these recommendations are provided. Due to this, the described recommendation system may provide recommendations that client device users are more comfortable interacting with (resulting in conversion) than recommendations provided by conventional techniques. Moreover, the recommendations provided by the described recommendation system may result in higher user engagement and retention than those provided by conventional systems. Further, the described recommendation system performs less computing than conventional recommendation systems because it ranks and selects items identified based on a single attribute at a time. The described recommendation system is thus able to provide recommendations after a request is received in substantially real time, which is faster than conventional systems.

Term Descriptions

As used herein, the term "justification" refers to a human-interpretable explanation describing why a recommendation is provided. In one or more implementations, justifications are configured as text strings explaining why particular recommendations are selected for provision to a client device user.

As used herein, the term "serendipitous" refers to a recommendation for an item a client device user has not demonstrated a particular affinity toward but which the client device user does like, e.g., when the client device user consumes the digital content.

As used herein, a "strength-of-interaction measure" refers to a measured amount that a client device user demonstrates interest in or likes an item. A strength-of-interest measure may be based on an explicit indication of the client device user's interest, such as a user-provided rating of the item. An example of this is selection of a number of stars out of a possible number of selectable stars. Alternately or in addition, a strength-of-interest measure may implicitly measure the client device user's interest based on behavior of the client device user toward an item. Examples of this include, but are not limited to, an amount of time spent consuming (e.g., watching, listening to, and so on) a digital content item, a percentage of time spent consuming the digital content item, a number of times the user consumes the digital content item, and so forth.

As used herein, the term "attribute" of a digital content item refers to a characteristic of the digital content item that is describable in human language. By way of example, attributes for recommendable video include genres, such as action, comedy, drama, romance, and so on. Accordingly, a video can be associated with a 'Comedy' attribute, e.g., when the video is relatively funny. In the following discussion, this video is said to be "associated with" the 'Comedy' attribute or "has the" 'Comedy' attribute. Indeed, a video may be associated with multiple genre attributes, such as 'Action' and 'Comedy'. Moreover, videos may be associated with other attributes that describe characteristics of the videos, such as describing subject matter of the videos, actors appearing in the videos, types of videos, awards received, and so on. Indeed, the attributes used to describe videos may be different than enumerated herein without departing from the spirit or scope of the described techniques. Further still, various attributes may be used to describe different types of recommendable items, e.g., audiobooks, e-books, products or services, music, and so forth, without departing from the spirit or scope of the techniques described herein.

As used herein, the term "content tag" refers to data that is usable to describe an attribute of a recommendable item and/or data that associates an attribute with a recommendable item. An example of a content tag is a text string, in metadata of a digital content item or associated with the digital content item in some other way, that is indicative of the attribute. For instance, an action video may have in its metadata a text string 'Action'; the presence of this text string being effective to associate the video with the 'Action' attribute. Content tags may associate attributes with recommendable items in different ways without departing from the spirit or scope of the described techniques.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ collaborative-filtered content recommendations with justification in real-time as described herein. The illustrated environment 100 includes a service provider system 102, client device 104, and digital content delivery system 106 that are communicatively coupled, one to another, via a network 108.

Computing devices that are usable to implement the service provider system 102, client device 104, and digital content delivery system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service provider system 102 is illustrated as including a service manager module 110 that is representative of functionality to provide services accessible via the network 108 that are usable to make products or services available to consumers. The service manager module 110, for instance, may expose a website or other functionality that is accessible via the network 108 by a communication module 112 of the client device 104. The communication module 112, for instance, may be configured as a browser, a network-enabled application, and so on that obtains data from the service provider system 102 via the network 108. This data is employed by the communication module 112 to enable a user of the client device 104 to communicate with the service provider system 102 to obtain information corresponding to the products or services, e.g., web pages with digital videos when the service provider system 102 is a video platform service.

In order to personalize the information provided to the client device users, the service provider system 102 may employ a digital content delivery system 106. Although functionality of the digital content delivery system 106 is illustrated as separate from the service provider system 102, this functionality may also be incorporated as part of the service provider system 102, further divided among other entities, and so forth. The digital content delivery system 106 includes a recommendation manager module 114 that is implemented at least partially in hardware of a computing device to provide recommendations 116 of digital content with justifications 118 for those recommendations to the client device 104. The justifications 118 indicate why the recommendations 116 are provided, e.g., "These video recommendations are provided because User has demonstrated an interest in comedy videos." The digital content delivery system 106 delivers the recommendations 116 and the justifications 118 by configuring and transmitting communication 120. In general, the communication 120 is configured as data that can be processed by the client device 104 to incorporate the recommendations 116 and the justifications 118 into a user interface for output, e.g., via a display of the client device 104, via speakers associated with the client device 104, and so forth.

The recommendation manager module 114 is illustrated with affinity module 122 and recommendations generation module 124. The affinity module 122 and the recommendations generation module 124 represent functionality to carry out aspects of recommendation—and justification—provision based on digital content of digital content catalog 126 and user data 128, which are illustrated in storages 130, 132, respectively. Here, the digital content catalog 126 is illustrated with digital content item 134 having content tags 136. The digital content catalog 126 is further depicted with ellipses to represent that the digital content delivery system 106 includes or has access to multiple digital content items 134.

In accordance with the described techniques, the digital content items 134 may assume a variety of forms, including, but not limited to digital content including videos, music, audiobooks, digital books or periodicals, news articles, web pages for products or services, advertisement components for products or services, and so forth. To this end, the recommendations 116 are each configured to recommend to a user of the client device 104 a respective video, song, audiobook, digital book or periodical, news article, product or service, and so on. The content tags 136 represent information describing the respective digital content item 134, such as categories for describing digital content of a type or other pertinent information. In connection with videos, for instance, the content tags 136 can be configured to describe categories such as genre (e.g., comedy, action, and romance), subject matter (e.g., floods, cats, and dogs), type (e.g., movie, television, and news video), and so forth. The content tags 136 can also be configured to describe other aspects of videos, such as actors, directors, producers, reviews, length, and so on. Indeed, the content tags 136 can be formatted in different ways and used to describe a variety of attributes of digital content items 134 without departing from the spirit or scope of the techniques described herein.

Data may also be generated based on the provision of the digital content items 134 to describe which users received these items as well as interactions of the users with the items. This generated data may be included in user profile 138, for example. The user profile 138 represents a single client device user, e.g., a client device user having a user account with the digital content delivery system 106, a client device user authenticated to the client device 104, and/or a client device user the digital content delivery system 106 otherwise tracks across various interactions with the client device 104. The user data 128 is depicted with ellipses to indicate that the storage 132 is configured to store information about multiple users. As described herein, the affinity module 122 and the recommendations generation module 124 use the interaction information 140 along with the content tags 136 of the digital content items 134 to determine the digital content items 134 to recommend and the justifications 118 for recommending the recommended items.

In particular, these modules use a strength-of-interaction measure 142 to carry out the functionality described above and below. Broadly speaking, the strength-of-interaction measure 142 measures an amount that a client device user demonstrates interest in or likes a digital content item 134. By way of example, the strength-of-interaction measure 142 may be based on an explicit indication of a client device user's interest, such as a user-provided rating, e.g., a number of stars out of a possible number of stars. Alternately or in addition, the strength-of-interaction measure 142 may implicitly measure interest based on behavior of a client device user, such as based on an amount of time spent consuming (e.g., watching, listening to, and so on) a digital content item, a percentage of time spent consuming the digital content item, a number of times the user consumes the digital content item, and so forth. In one or more implementations, the strength-of-interaction measure 142 may be a combination of multiple different aspects indicative of a client device user's interest in a digital content item. Accordingly, the strength-of-interaction measure 142 may measure or estimate user interest in a digital content item in a variety of ways without departing from the spirit or scope of the techniques described herein.

To generate the recommendations 116 and the justifications 118 for a particular user, initially the affinity module 122 determines or otherwise obtains the strength-of-interaction measure 142 for each of the digital content items the particular user has consumed. These strength-of-interaction measures 142 are determined for digital content items that are pertinent to the digital content being recommended. If the digital content being recommended is videos, for instance, then the strength-of-interaction measures 142 are determined for videos the particular user has previously watched. Similarly, if the digital content being recommended is audiobooks, then the strength-of-interaction measures 142 are determined for audiobooks to which the particular user has previously listened.

In one or more implementations, the affinity module 122 generates a matrix based on these strength-of-interaction measures 142, such that the rows of the matrix correspond to client device users and the columns correspond to digital content items. Alternately, the columns of the matrix correspond to the client device users and the rows correspond to the digital content items. Here, the cells of the matrix are the strength-of-interaction measures 142. Accordingly, when the rows correspond to client device users and the columns correspond to digital content items, a row indicative of an individual user will include the strength-of-interaction measures 142 determined for the individual user in relation to each of the digital content items, and another row indicative of a different individual user will include the strength-of-interaction measures 142 determined for the different individual user in relation to each of the digital content items. It follows then that a column indicative of an individual digital content item includes the strength-of-interaction measures 142 for each of the client device users that consumed the item.

The affinity module 122 also generates a mapping of selected content attributes to the digital content items 134 of the digital content catalog 126 based on the content tags 136. Consider an example in which the affinity module 122 generates the mapping to map a catalog of digital movies to categories indicated by the content tags 136, such as genre and actors appearing in the videos. In this example, the videos may be associated with content tags such as 'action,' drama,"romance," as indicative of genre and tags such as 'Sarah Jessica Parker,' 'Hugh Jackman,' as indicative of actors appearing in the videos. In a similar fashion as the strength-of-interaction measures 142 are mapped to users using a matrix, in one or more implementations, the selected attributes are also mapped to the digital content items 134 using a matrix.

Referring again to the video example, the affinity module 122 generates a second matrix based on the digital content items 134 and the respective content tags 136. The affinity module 122 can configure this second matrix such that the rows of the matrix correspond to the digital content items 134 of the digital content catalog 126 and the columns correspond to the selected attributes. Alternately, the affinity module 122 can configure this second matrix such that the columns of the matrix correspond to the selected attributes and the rows correspond to the digital content items 134. Here, the cells of the matrix may simply be indications regarding whether the digital content items have a tag that indicates association with each of the attributes or not, e.g., the value of a cell may be '1' to indicate that a digital content item 134 has a content tag 136 indicative of the attribute (the presence of a tag describing a video as an 'action' video results in a '1' for an action-attribute column) and a '0' to indicate that the digital content item does not have a content tag 136 indicative of the attribute (the absence of a tag describing a video as an 'action' video results in a '0' for the action-attribute column). The association or non-association with an attribute can be indicated in other ways than one and zero, respectively, without departing from the spirit or scope of the techniques described herein.

In any case, the affinity module 122 is configured to determine affinities of a user in real-time for the different selected attributes, e.g., by computing a product of the above-described user-content matrix and the content-attribute matrix. Based on these determined affinities, the recommendations generation module 124 determines the digital content items 134 to provide to the client device 104 as the recommendations 116. To determine the recommendations 116, the recommendations generation module 124 filters the digital content items 134 of the digital content catalog 126 based on the determined affinities for the client device user. In one or more implementations, the recommendations generation module 124 does this by initially identifying from the digital content catalog 126 the digital content items 134 having a selected attribute for which the user is determined to have an affinity, e.g., a selected attribute for which the user has a highest determined affinity, the top-k selected attributes according to the determined affinities, the selected attributes for which the determined affinity meets a predetermined threshold, and so forth. Consider an example in which the affinity module 122 determines that a user of the client device 104 has a highest affinity for digital content items 134 with the content tag 136 'Finance'. In this example, the recommendations generation module 124 initially identifies each of the digital content items 134 having a 'Finance' content tag 136 in real-time. Once these are identified, the recommendations generation module 124 ranks the identified digital content items 134 in real-time based on the determined affinities of the client device user and characteristics of the identified items, as indicated by the content tags 136.

Unlike conventional techniques, the described techniques enable the digital content delivery system 106 to generate the recommendations 116 using collaborative filtering and also provide the recommendations 116 with the justifications 118. In contrast to this, conventional recommendation techniques leveraging collaborative filtering are based on latent factors that are capable of providing recommendations matching a user's demonstrated tastes but are not human-interpretable. Consequently, conventional recommendation techniques that use collaborative filtering do not also provide justifications—that correspond to the leveraged latent factors—for the recommendations. Because client device users can be leery of interacting with recommended digital content that is not presented with a justification, many conventionally configured systems do not utilize collaborative filtering. These conventional systems can thus fail to provide recommendations for digital content that is diverse, personalized for a particular client device user, and serendipitous. Using the described techniques, however, the recommendation manager module 114 is able to generate justifications as human-interpretable language (e.g., text) for recommendations determined with collaborative filtering, e.g., including recommendations for digital content that is diverse, personalized for a particular client device user, and serendipitous. As used herein, "serendipitous" refers to a recommendation for an item a client device user has not demonstrated a particular affinity toward but which the client device user does like, e.g., when the client device user consumes the digital content. Accordingly, the recommendation manager module 114 may cause more client device users to interact with the recommendations provided than conventional recommendation techniques.

Having considered an example environment, consider now a discussion of some example details of the techniques for rule determination of collaborative-filtered content recommendations with justifications in real-time in a digital medium environment in accordance with one or more implementations.

Collaborative-Filtered Content Recommendations with Justifications

Figure 2:
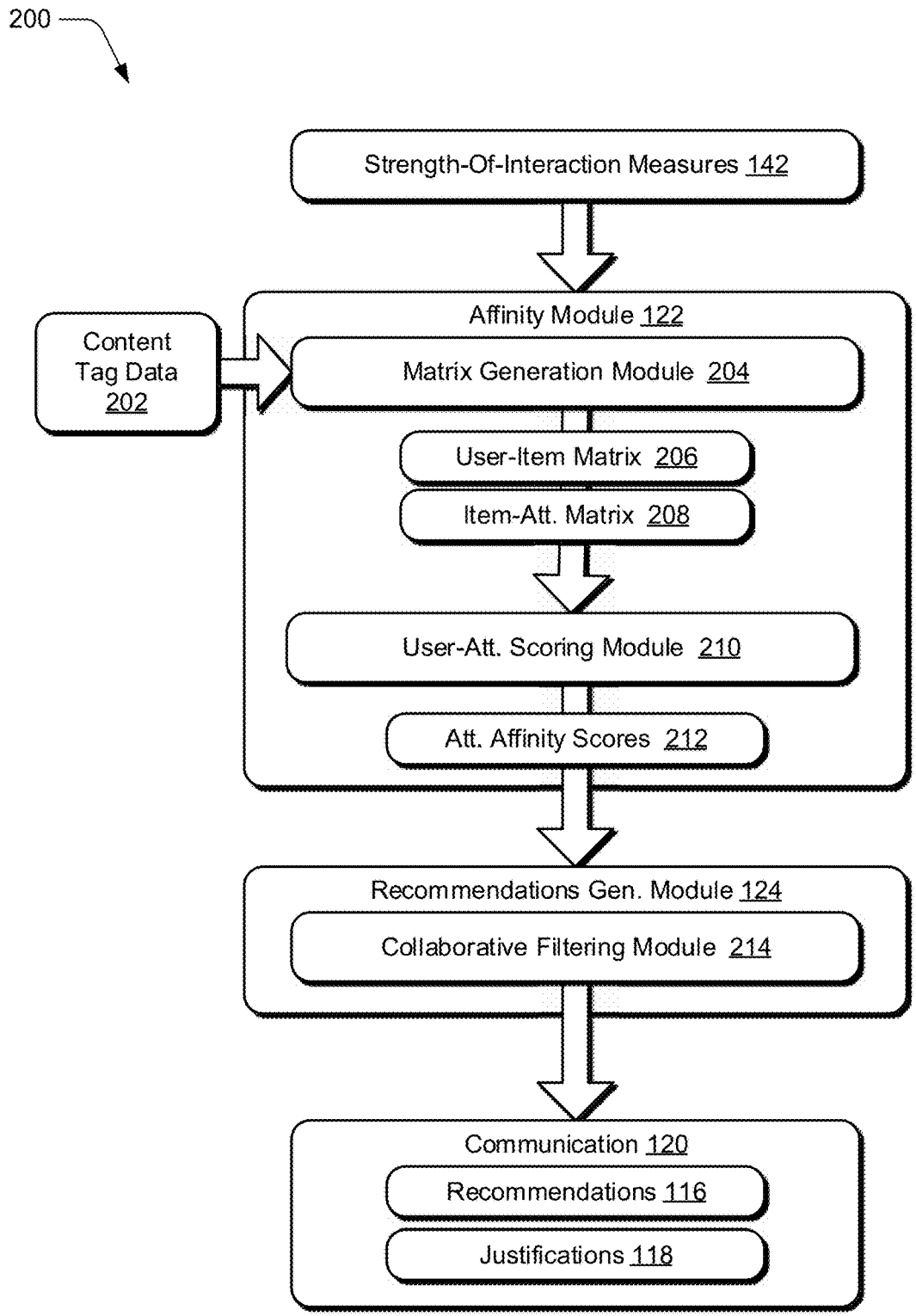
FIG. 2 depicts an example implementation in which a digital content delivery system of FIG. 1 provides digital content recommendations with justifications explaining why the recommendations are provided.

FIG. 2 depicts an example implementation 200 in which a digital content delivery system of FIG. 1 provides digital content as recommendations with justifications explaining why the recommendations are provided. The illustrated example 200 includes from FIG. 1 the affinity module 122 and the recommendations generation module 124.

The affinity module 122 is depicted obtaining the strength-of-interaction measures 142 and content tag data 202. The content tag data 202 is indicative of the content tags 136 with which the digital content items 134 of the digital content catalog 126 are tagged. In the illustrated example, the affinity module 122 is depicted with matrix generation module 204, which represents functionality to map users to the digital content items 134 of the catalog and to map selected attributes indicated by the content tags 136 to the digital content items 134. In one or more implementations, the matrix generation module 204 memorializes these mappings by generating user-item matrix 206 and item-attribute matrix 208. In this context, consider FIGS. 3A and 3B.

Figure 3A:
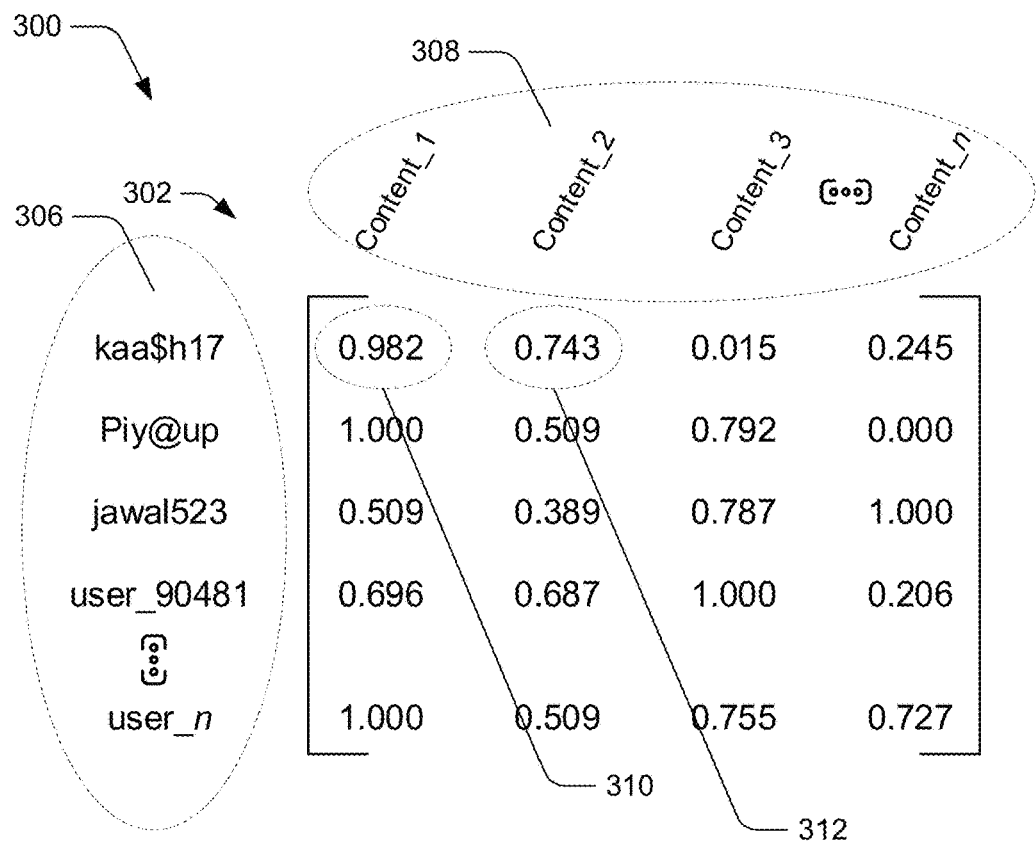
FIGS. 3A and 3B depict examples of user-to-content and content-to-attribute mappings, respectively.
Figure 3B:
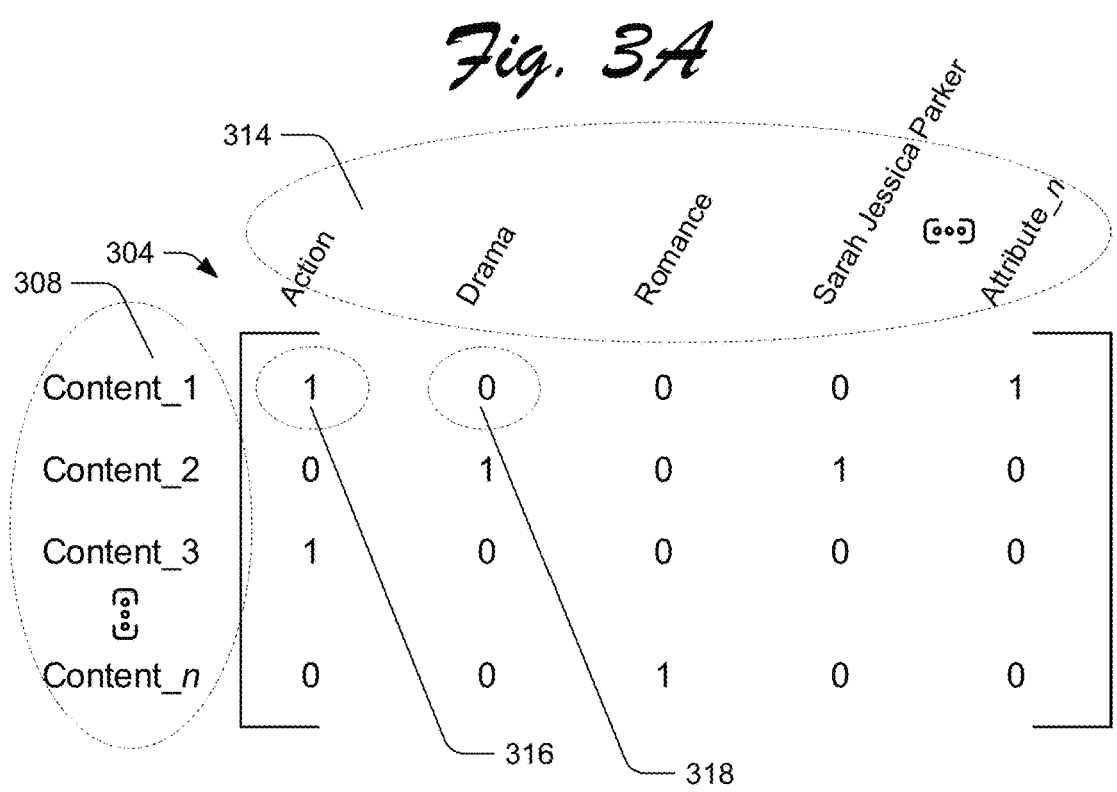

FIGS. 3A and 3B depict at 300 examples of user-to-content and content-to-attribute mappings. In particular, FIG. 3A depicts a user-to-content mapping configured as a first matrix 302 and FIG. 3B depicts a content-to-attribute mapping configured as a second matrix 304.

In the illustrated example 300, the rows of the first matrix 302 correspond to users 306 and the columns correspond to content items 308. In accordance with the described techniques, the users 306 are each associated with a user profile 138 and the content items 308 represent the digital content items 134 of the digital content catalog 126. Accordingly, the interaction information 140 of these users 306 describes interactions with the content items 308. In particular, the interaction information 140 includes a measure of the interaction strength, e.g., strength-of-interaction measures 142, that indicate a relative strength of a client device user's interaction with the different content items 308. As noted above, the strength-of-interaction measure 142 may be configured in a variety of ways (e.g., express rating given by a user, pro-rata amount of consumption, etc.) without departing from spirit or scope of the techniques described herein.

Regardless of the particular measure, the cells of the first matrix 302 represent strength-of-interaction measures 142 indicated by a respective user's interaction information. For instance, a value of first cell 310 ('0.982') corresponds to the strength-of-interaction measure 142 included in the user profile 138 of the user 'kaa$h17' for the content item 'Content_1'. Similarly, a value of second cell 312 ('0.743') corresponds to another strength-of-interaction measure 142 included in the user profile 138 of the user 'kaa$h17' for the content item 'Content_2'. In accordance with the described techniques, the matrix generation module 204 processes the strength-of-interaction measures 142 to generate the user-item matrix 206 so that it is configured in a similar manner as the first matrix 302, e.g., one axis corresponding to client device users, the other corresponding to items of a catalog, and cells corresponding to respective strength-of-interaction measures of these client device users with these items.

In contrast, the rows of the second matrix 304 correspond to the content items 308 and the columns correspond to selected attributes 314 of content items. In accordance with the described techniques, the selected attributes 314 correspond to attributes of content items that are describable using the content tags 136. In particular, the content tags 136 represent the attributes with which a content item is associated, e.g., if one attribute that can be used to describe content is 'Action', the presence of an 'Action' content tag 136 indicates that the respective content item is an action content item or has the attribute of being associated with action. To this end, the cells of the second matrix 304 include values indicative of whether a corresponding content item 308 is associated with the selected attributes 314 or not, as indicated by the content tags 136.

In this example 300, a value of one indicates that a content item is associated with the attribute and a value of zero indicates that the content item is not associated with the attribute. For instance, third cell 316 has a value of one. This indicates that the content item 308 'Content_1' is tagged with an 'Action' content tag 136, which indicates that 'Content_1' is associated with the action attribute. In contrast, fourth cell 318 has a value of zero. This indicates that the content item 308 'Content_1' is not tagged with a 'Drama' content tag 136, indicating therefore that 'Content_1' is not associated with the drama attribute. In accordance with the described techniques, the matrix generation module 204 processes the content tag data 202 to generate the item-attribute matrix 208 so that it is configured in a similar manner as the second matrix 304, e.g., one axis corresponding to the items of the digital content catalog 126, the other corresponding to selected attributes that can be used to describe the items, and cells corresponding to values indicative of association or non-association of the items with the selected attributes as indicated by the content tags 136.

The affinity module 122 is further depicted having user-attribute scoring module 210 in the illustrated example 200. The user-attribute scoring module 210 represents functionality to compute attribute affinity scores 212 for client device users based on the user-item matrix 206 and the item-attribute matrix 208. In general, the attribute affinity scores 212 represent a given client device user's affinity for digital content items associated with a particular attribute. With reference to the attributes illustrated in FIG. 3B, for instance, the attribute affinity scores 212 are configured to indicate a particular user's affinity for content associated with the 'Action' attribute. To generate these attribute affinity scores 212, the user-attribute scoring module 210 computes a product of the user-item matrix 206 and the item-attribute matrix 208. In one or more implementations, the user-attribute scoring module 210 further computes Log-Likelihood Ratios from the multiplied matrices to derive the attribute affinity scores 212. The user-attribute scoring module 210 also represents functionality to configure the attribute affinity scores 212 as latent factor vectors—generating one such vector for each client device user. With respect to FIGS. 3A and 3B, attribute affinity scores configured as latent factor vectors indicate for each of the users 306 their affinity scores for 'Action', 'Drama', 'Romance', 'Sarah Jessica Parker,' and 'Attribute_n'.

The recommendations generation module 124 is depicted obtaining the attribute affinity scores 212, e.g., obtaining the per-user latent factor vectors. From the attribute affinity scores 212, the recommendations generation module 124 is configured to determine the recommendations 116. To determine the recommendations 116, the recommendations generation module 124 employs collaborative filtering module 214. Initially, the collaborative filtering module 214 identifies the digital content items 134 of the digital content catalog 126 having a particular attribute, e.g., an attribute corresponding to a highest attribute affinity score 212 for a client device user under consideration. Consider an example in which a highest of the attribute affinity scores 212 for a given client device user corresponds to the 'Action' attribute. In this scenario, the collaborative filtering module 214 initially identifies each digital content item of the digital content catalog 126 having an 'Action' content tag 136. The collaborative filtering module 214 then ranks the identified digital content items.

In one or more implementations, the collaborative filtering module 214 ranks the identified digital content items based on the attribute affinity scores 212 for the client device user under consideration and the attributes with which each of these digital content items is associated, e.g., according to the content tags 136. These attribute affinity scores may be represented, for instance, using the latent factor vector generated for the client device user under consideration. The collaborative filtering module 214 may further utilize latent factor vectors that are generated for the digital content items from the user-item matrix 206 using a matrix factorization algorithm, such as Alternating Least Squares. In such scenarios, the collaborative filtering module 214 computes an identified content score as a dot product of the client device user's latent factor vector and the latent factor vector of an identified digital content item. The collaborative filtering module 214 then ranks the identified digital content items for the user under consideration according to these dot products. For the recommendations 116, the collaborative filtering module 214 selects the top-k ranking digital content items.

These top-k digital content items correspond to items identified as associated with one particular attribute. This particular attribute further serves as a basis for generating the justifications 118 of these top-k items, such that if the attribute relative to which these items are initially identified is 'Action' then these items can be presented with a justification such as 'Because you demonstrated an interest in action items'. The number of items selected in relation to a single attribute may be based on a user interface via which the items are being presented, e.g., a form factor of the client device 104, display area of an application's user interface, and so forth.

The collaborative filtering module 214 is capable of performing this identifying, ranking, and selecting of content items for each of the different selected content attributes. However, the collaborative filtering module 214 may limit the identifying, ranking, and selecting to a subset of the attributes, such as a highest scoring attribute (according to the attribute affinity scores), a top-k number of attributes, and so forth. Like the number of items selected for recommendation with one particular attribute, a number of attributes for which items are identified may be based on a user interface, e.g., a form factor of the client device 104, display area of an application's user interface, and so forth. As items are identified, ranked, and selected for recommendation relative to a particular attribute, the collaborative filtering module 214 uses that particular attribute to serve as a basis for generating the corresponding justifications 118. The recommendations generation module 124 generates the communication 120 with the recommendations 116 and the justifications 118 determined in this way.

In one or more implementations, the recommendations generation module 124 generates the communication 120 and communicates it to the client device 104 as content items are recommended in relation to each attribute. Alternately or in addition, the recommendations generation module 124 generates the communication 120 and communicates it to the client device 104 for content items recommended in relation to multiple attributes. In any case, the communication 120 enables the client device 104 to present the recommendations 116 with the justifications 118. In this context, consider FIG. 4.

Figure 4:
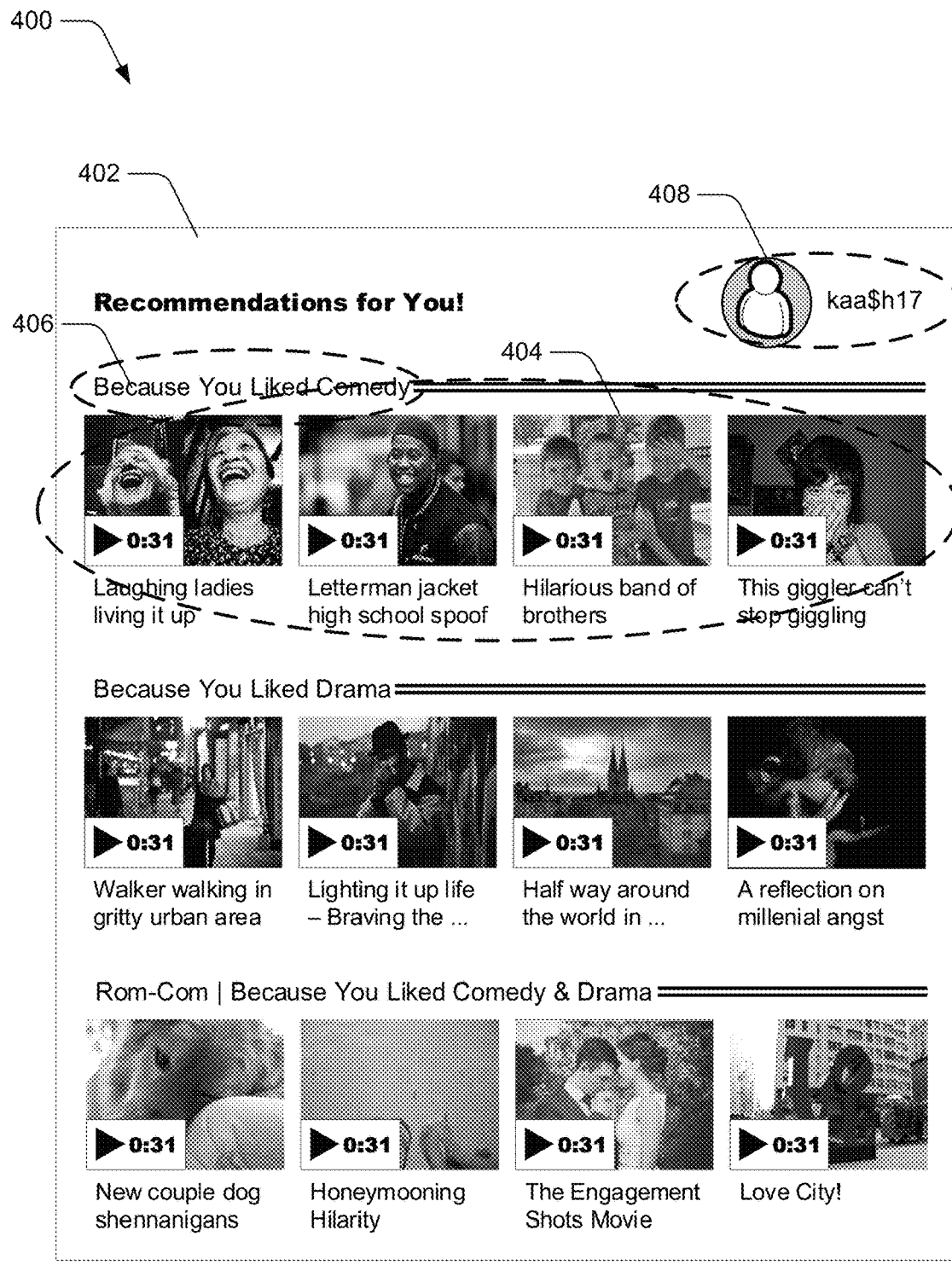
FIG. 4 depicts an example user interface configured to present the digital content recommendations with the justifications.

FIG. 4 depicts an example user interface 400 that is configured to present digital content recommendations with justifications indicating why the recommendations are provided. The illustrated example 400 includes recommendation presentation interface 402, which is illustrated as a graphical user interface though other configurations (e.g., audio) are contemplated in the spirit or scope of the techniques described herein.

In accordance with the described techniques, the recommendation presentation interface 402 is generated to present the recommendations 116 along with the justifications 118. For example, the recommendation presentation interface 402 includes video recommendations 404 and video justification 406. The video justification 406 indicates to a user why the video recommendations 404 are being presented via the recommendation presentation interface 402. In this case, the video justification 406 indicates that the video recommendations 404 are presented via the user interface 'Because You Liked Comedy'. This represents that the attribute affinity scores 212 computed for indicated user 408 ('kaa$h17') may include a highest affinity score for 'Comedy' videos.

The other recommendations presented via the recommendation presentation interface 402 also include justifications. The second row of video recommendations, for instance, is presented with the justification 'Because You Liked Drama'. In contrast to the video justification 406 and the justification for the second row of videos, the third row of video recommendations represents a predicted genre of videos (e.g., romantic comedy "Rom-Com") with the justification 'Because You Liked Comedy & Drama'. This indicates that the recommendations generation module 124 is configured to predict content for which the indicated user 408 will have an affinity based on a combination of multiple attributes—in this case the attributes of being associated with comedy and being associated with drama.

Broadly speaking the recommendations generation module 124 is configured to predict content for which a user will have an affinity but for which the user has not yet demonstrated an affinity. Invariably, most users will not have consumed each digital content item 134 of the digital content catalog 126. As part of predicting attributes (and thus content) for which a user will have an affinity, the affinity module 122 augments the user-item matrix 206 to include strength-of-interaction measures for the digital content items 134 a user has not yet consumed. In one or more implementations, the affinity module 122 determines at least one other user that is similar to a user for which the user-item matrix 206 is being completed. The affinity module 122 copies strength-of-interaction measures from the at least one other user's matrix to the user-item matrix 206 being completed. The affinity module 122 may augment the user-item matrix 206 to complete it in other way without departing from the spirit or scope of the techniques described herein.

Given this, the user-attribute scoring module 210 can re-compute the attribute affinity scores 212 with the augmented user-item matrix 206, e.g., by multiplying the augmented user-item matrix 206 and the item-attribute matric 208 and computing a Log-Likelihood Ratio based on these multiplied matrices. The collaborative filtering module 214 can then perform the above described identifying, ranking, and selecting to predict content a user will like even though the content has attributes for which the user has not yet demonstrated an affinity. This enables the recommendations generation module 124 to provide the recommendations 116 with the justifications 118 to client device users that have consumed a relatively small amount of content, e.g., new users to a platform. This also enables the recommendations generation module 124 to recommend newly released (e.g., posted, published, and so on) digital content items, digital content items having an attribute the user is predicted to have an affinity for, and so forth. This is because the recommendation manager module 114 exploits the metadata (e.g., content tags 136) of recommendable items rather than recommending items based on numbers of client device users having consumed the items. Recommending items based on metadata and determined user affinities can be especially beneficial for time-sensitive content such as news content, where items may be considered stale by the time enough client device users have consumed an item to cause it to be "popular."

As noted above, the collaborative filtering module 214 filters content attribute-by-attribute for recommendations, e.g., identifying digital content items of the digital content catalog 126 that are associated with one attribute and then next attributes (one attribute at a time) if more recommendations are requested. In so doing, the recommendations generation module 124 avoids computing a dot product or a custom Foundation Matrix score (FM-score) over an entirety of the digital content catalog 126. Limiting dot product computations to the digital content items associated with one attribute enables the recommendations generation module 124 to select items for recommendation more efficiently (reduced computations) and faster than conventional recommendation techniques. This enables the recommendation manager module 114 to provide the recommendations 116 in substantially real-time responsive to a request for the recommendations 116, e.g., a request from the client device 104 made via an application programming interface (API). Moreover, the reduction in the computations enables the recommendation manager module 114 to scale its recommendation provision to a larger number of client device users than conventional techniques while maintaining substantially real-time delivery.

Having discussed example details of the techniques for collaborative-filtered content recommendations with justification in real-time, consider now some example procedures to illustrate additional aspects of the techniques.

Example Procedures

This section describes example procedures for collaborative-filtered content recommendations with justification in real-time in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the digital content delivery system 106 of FIG. 1 that makes use of an affinity module 122 and recommendations generation module 124.

Figure 5:
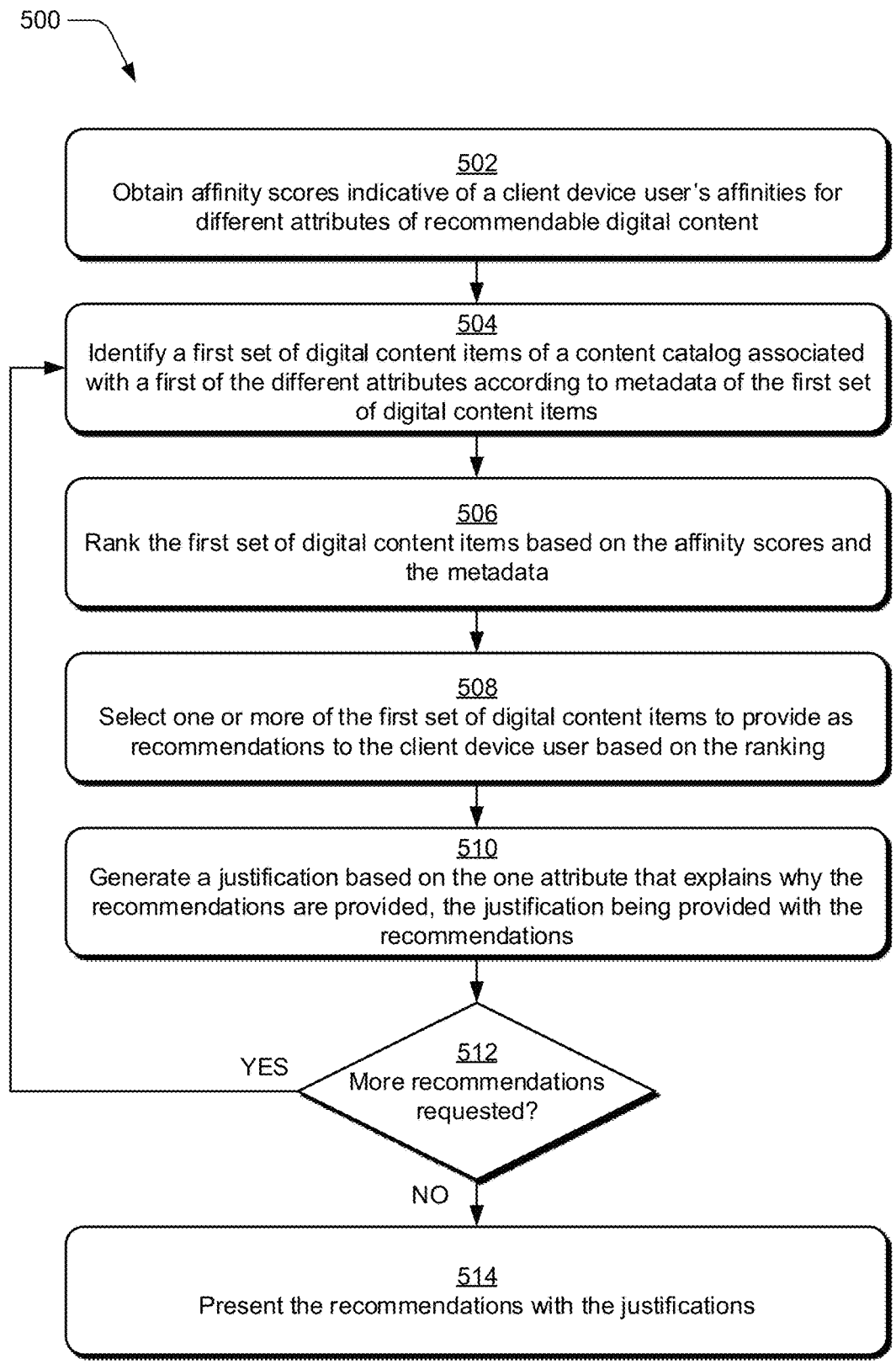
FIG. 5 depicts a procedure in an example implementation in which digital content recommendations are provided with justifications to a client device.

FIG. 5 depicts an example procedure 500 in which digital content recommendations are provided with justifications to a client device. Affinity scores are obtained that are indicative of a client device user's affinities for different attributes of recommendable digital content (block 502). By way of example, the recommendations generation module 124 obtains the attribute affinity scores 212. As discussed above, these attribute affinity scores 212 are indicative of a client device user's affinities for different attributes of recommendable digital content, e.g., the digital content items 134 of the digital content catalog 126.

A first set of digital content items of a content catalog are identified that are associated with a first of the different attributes (block 504). In accordance with the principles discussed herein, the digital content items are identified according to metadata describing these items. Further, the one attribute used as a basis for identifying these items is based on the obtained affinity scores, e.g., an attribute corresponding to the highest affinity score. By way of example, the collaborative filtering module 214 identifies one or more of the digital content items 134 of the digital content catalog 126 that are associated with one of the different attributes, such as an attribute having a highest of the attribute affinity scores obtained at block 502. The collaborative filtering module 214 identifies these digital content items according to the content tags 136—the identified items having a content tag that associates the identified items with the one different attribute.

The first set of digital content items are ranked based, in part, on the obtained affinity scores and the metadata of the first set of digital content items (block 506). By way of example, the collaborative filtering module 214 ranks the digital content items identified at block 504. The collaborative filtering module 214 ranks these identified items based, in part, on the affinity scores obtained at block 502 and the content tags 136. As discussed above and below, the affinity scores are indicated by a latent factor vector computed for the client device user, and the content tags of the identified items are indicated by latent factor vectors computed for the identified content items.

One or more of the first set of digital content items are selected for recommending to the client device user based on the ranking (block 508). By way of example, the collaborative filtering module 214 selects one or more of the digital content items identified at block 504 based on the ranking at block 506, such as the top-k ranked items. The recommendations generation module 124 configures information about these items for provision as the recommendations 116. In other words, the recommendations 116 are formed to represent the items selected at block 508.

A justification is generated based on the first attribute and explains why the recommendations are provided (block 510). In accordance with the principles discussed herein, the justification is provided with the recommendations. By way of example, the recommendations generation module 124 generates the justifications 118 for the items selected at block 508. The justifications 118 explain why those items are recommended to the client device user via the recommendations 116. The recommendations generation module 124 further provides the justifications 118 with the recommendations 116, e.g., as part of the communication 120.

Determine whether more recommendations are requested (block 512). If a determination is made that more recommendations are requested (i.e., "YES" at block 512), the method returns to block 504 to identify at least a second set of digital content items that are associated with at least a second of the different attributes, e.g., corresponding to at least a second-highest affinity score. By way of example, the recommendations generation module 124 determines that more recommendations are requested than items selected at block 508 and the method returns to block 504 to identify digital content items associated with another attribute, e.g., a next-highest scoring attribute. If a determination is made that more recommendations are not requested (i.e., "NO" at block 512), however, then the recommendations are presented with the justifications (block 514). By way of example, the recommendations generation module 124 determines that more recommendations are not requested, e.g., the number of items selected equals or exceeds a number of items requested. The digital content delivery system 106 delivers the recommendations 116 with the justifications 118 to the client device 104, which includes functionality operable to present the recommendations 116 with the justifications 118. For instance, the client device 104 presents the recommendation presentation interface 402 having the video recommendations 404 and the video justification 406. As discussed above, the recommendations 116 may recommend items other than videos, such as music, e-books, audiobooks, products and services for purchase, and so on.

Figure 6A:
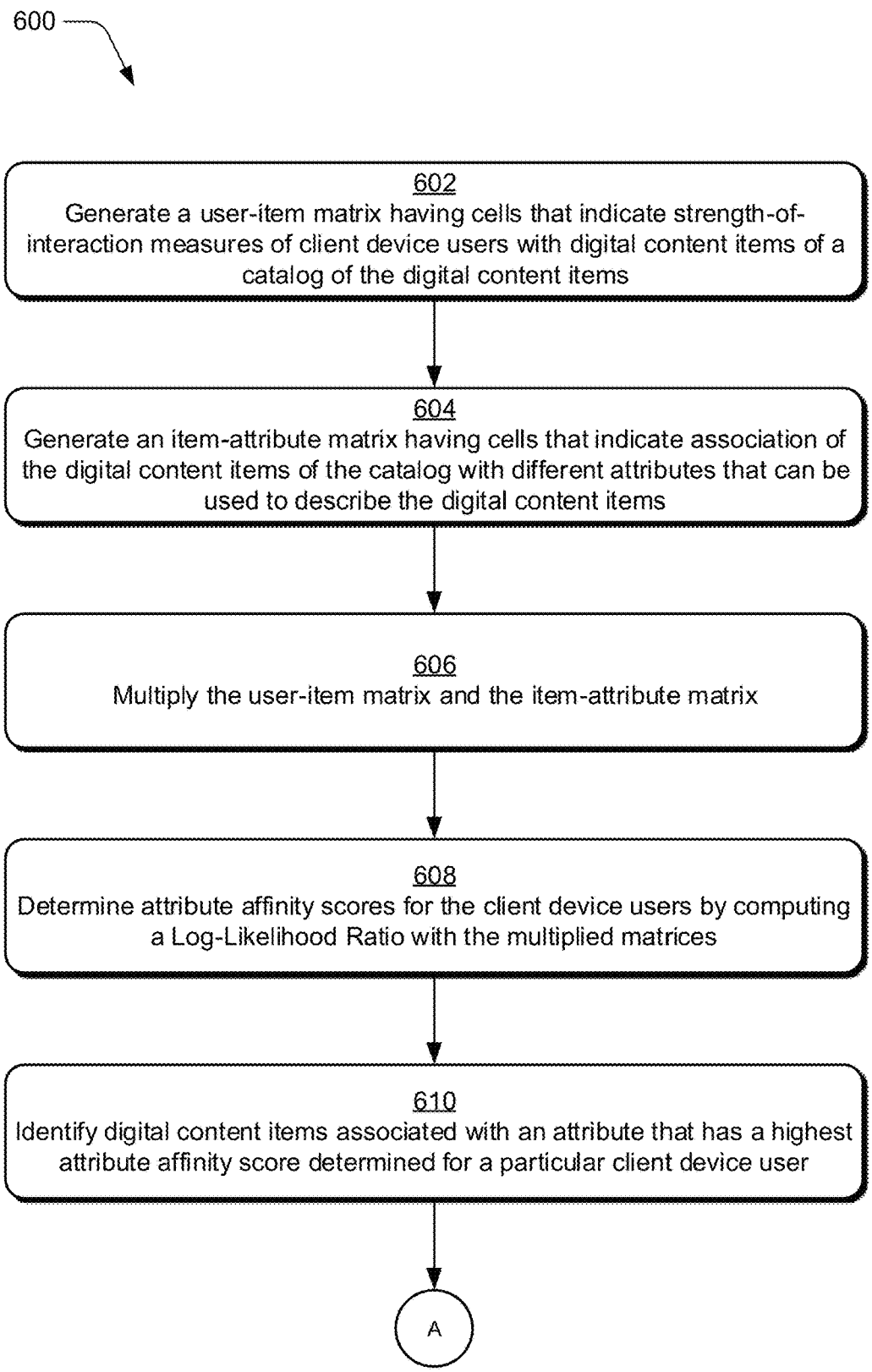
FIGS. 6A and 6B depict a procedure in an example implementation in which scores indicative of affinities of client device users for content having different attributes are computed and in which these affinity scores are used to collaboratively filter digital content of a catalog for recommendation to the client device users.
Figure 6B:
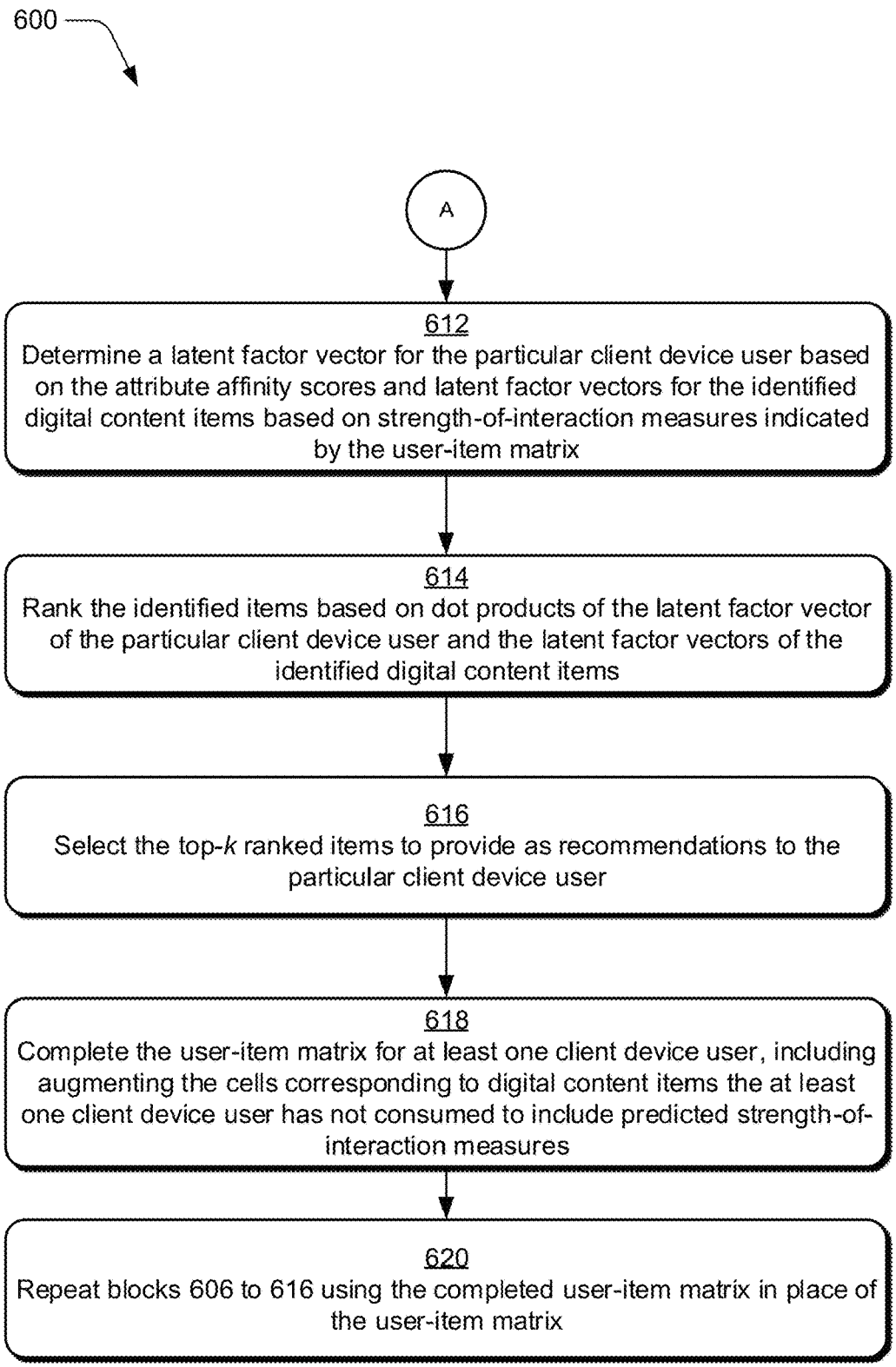

FIGS. 6A and 6B depict an example procedure 600 in which scores indicative of affinities of client device users for content having different attributes are computed and in which these affinity scores are used to collaboratively filter digital content of a catalog for providing recommendations to the client device users in real-time.

A user-item matrix is generated having cells that indicate strength-of-interaction measures of client device users with digital content items of a catalog of the digital content items (block 602). By way of example, the affinity module 122 generates the user-item matrix 206 based on the strength-of-interaction measures 142 taken from the user data 128. As noted above, the strength-of-interaction measure 142 measures one or more interactions of a user with a digital content item 134 of the digital content catalog 126—some measures may correspond to an explicitly expressed indication (e.g., a rating) of interest in a content item while other measures estimate the interest in the content (e.g., a length of time of the interaction).

An item-attribute matrix is generated having cells that indicate association of the digital content items of the catalog with different attributes that can be used to describe the digital content items (block 604). By way of example, the affinity module 122 generates the item-attribute matrix 208 for the digital content items 134 of the digital content catalog 126. Based on the content tags 136, the affinity module 122 sets cell values of the item-attribute matrix 208 to indicate whether a digital content item is associated with the different attributes or not.

The user-item matrix and the item-attribute matrix are multiplied (block 606). By way of example, the user-attribute scoring module 210 multiplies the user-item matrix 206 and the item-attribute matrix 208. Attribute affinity scores are determined for the client device users by computing a Log-Likelihood Ratio (LLR) with the multiplied matrices (block 608). By way of example, the user-attribute scoring module 210 determines the attribute affinity scores 212 by computing an LLR with the user-item matrix 206 and the item-attribute matrix 208 multiplied at block 606.

Digital content items associated with an attribute are identified for a particular client device user (block 610). In accordance with the principles discussed herein, the attribute has a highest attribute affinity score for the particular client device user. By way of example, the collaborative filtering module 214 identifies the digital content items 134 of the digital content catalog 126 that are associated with a highest-scoring attribute determined for a user of the client device 104. The procedure 600 continues at 'A' from FIG. 6A to FIG. 6B.

A latent factor vector is determined for the particular client device user and latent factor vectors are determined for the identified digital content items (block 612). In accordance with the principles discussed herein, the latent factor vector for the particular client device user is determined based on the attribute affinity scores and the latent factor vectors for the identified digital content items are determined based on strength-of-interaction measures as indicated by the user-item matrix 206. By way of example, the recommendations generation module 124 determines a latent factor vector for a user of the client device 104. The recommendations generation module 124 determines the latent factor vector of the client device 104's user based on the attribute affinity scores 212 computed for the user. The recommendations generation module 124 also determines latent factor vectors for the digital content items identified at block 610. In one or more implementations, the recommendations generation module 124 determines the latent factor vectors for these identified digital content items by using a matrix factorization algorithm (e.g., Alternating Least Squares) in relation to the user-item matrix 206.

The identified items are ranked based on dot products of the latent factor vector of the particular client device user and the latent factor vectors of the identified digital content items (block 614). By way of example, the collaborative filtering module 214 computes dot products of the client device user's latent factor vector and the latent factor vectors of the identified digital content items. The collaborative filtering module 214 then ranks the identified items based on the computed dot products.

A top-k ranked items are selected to provide as recommendations to the particular client device user (block 616). By way of example, the collaborative filtering module 214 selects a top-k ranked items to provide as the recommendations 116 to a user of the client device 104. In one or more implementations, k corresponds to a number equal to or greater than one that is controlled by a user interface of the client device 104 via which the recommendations 116 are to be presented, e.g., an application programming interface (API) associated with the user interface may request k recommendations in relation to an attribute.

The user-item matrix is completed for at least one client device user (block 618). In accordance with the principles discussed herein, this completion includes augmenting the user-item matrix's cells that correspond to digital content items the at least one client device user has not consumed. In particular, the cells corresponding to the not-yet-consumed digital content items are augmented to include predicted strength-of interaction measures. By way of example, the affinity module 122 completes the user-item matrix 206 for a user of the client device 104. The affinity module 122 completes the user-item matrix 206 by augmenting the cells that correspond to the digital content items the client device 104's user has not consumed. In one or more implementations, the affinity module 122 augments the cells with strength-of-interaction measures taken from other users that the affinity module 122 determines similar to the user of the client device 104.

Absent completion of the user-item matrix 206, the affinity module 122 may not be able to identify affinities for attributes that collaborative filtering techniques and low-rank matrix factorization can be leveraged to identify. By completing the user-item matrix 206, however, the affinity module 122 is able to leverage such collaborative filtering techniques and low-rank matrix factorization to identify affinities for some attributes—the affinities identified using these techniques contrast with affinities already demonstrated by the user according to the digital content items the user has actually consumed. In other words, by completing the user-item matrix 206, the affinity module 122 is not limited providing recommendations based solely on the limited content items the user has consumed.

Blocks 606 through 616 are repeated using the completed user-item matrix in place of the user-item matrix (block 620). By way of example, the recommendation manager module 114 leverages the functionality of the affinity module 122 and the recommendations generation module 124 to provide predictive recommendations recommendations for content that is associated with attributes the user of the client device 104 has not yet demonstrated an affinity—by repeating block 606 through 616 using the completed user-item matrix in lieu of the user-item matrix 206. In one or more implementations, the user-item matrix 206, before being completed, includes strength-of-interaction measures 142 for the digital content items 134 with which client device users have interacted. For the digital content items 134 the client device users have not interacted with, the user-item matrix 206, before being completed, includes values or other indicator representative of the non-interaction.

Consider an example recommendation scenario in which the recommendation manager module 114 generates recommendations in connection with a number of users, a number of digital content items, and a defined number of attributes. In the following discussion, the number of users is represented by the term 'M', the number of digital content items is represented by the term 'N', and the number of attributes is represented by the term 'A'. Further, the affinity module 122 may leverage a number of latent factors, k, (e.g., 10-40 latent factors). In this example and the following discussion, assume that the number of users M and the number of digital content items N, are orders of magnitude greater than A or k.

In this example, the recommendation manager module 114 leverages the functionality represented by the affinity module 122 and the recommendations generation module 124 to implement a sparse matrix factorization algorithm, e.g., Alternating Least Squares (ALS). For instance, the recommendation manager module 114 leverages this functionality to implement the sparse matrix factorization algorithm in relation to a rating matrix R having dimensions M×N. As part of this, the affinity module 122 initially generates two matrices—a first elemental matrix U, having dimensions M×k, and a second elemental matrix V, having dimensions k×N. Given that the recommendation manager module 114 generates the ratings matrix R as a sparse matrix, the affinity module 122 is employed to compute user-attribute affinities with LLR by multiplying the ratings matrix R by the item-attribute matrix 208. The runtime complexity for the affinity module 122 to perform such computations is proportional to a number of ratings in the ratings matrix R and is not proportional to M×N, which is a much larger number than the number of ratings or non-zero entries in the ratings matrix R.

In the continuing scenario assume, however, that the affinity module 122 completes this ratings matrix R to form completed ratings matrix R1, e.g., by multiplying the first elemental matrix U and the second elemental matrix V. In this scenario, the cells (or almost all of the cells) of the completed ratings matrix R1 are populated with non-zero entries. To this extent, the completed ratings matrix R1 is a dense matrix. Accordingly, using the completed ratings matrix R1 to identify the user attribute affinities involves a greater number of computations—and is thus more computationally expensive—than multiplying the sparse ratings matrix R by the item-attribute matrix 208. Consider, for instance, that a computational cost for the affinity module 122 to multiply the completed ratings matrix R1 with the item-attribute matrix 208 is proportional to the following:

$$C_{R1\ Mult} = (M \times k \times N) + (M \times N \times A)$$

Here, the term $C_{R1\ Mult}$ represents the computational cost of using the completed ratings matrix R1 to compute the attribute affinity scores 212. Further, the product of M×k×N represents a computing cost of the affinity module 122 to multiply the first and second elemental matrices U and V, respectively. In contrast, the product of M×N×A represents a computing cost of the affinity module 122 to multiply the completed ratings matrix R1 with the item-attribute matrix 208.

Broadly speaking, matrix multiplication is associative. The affinity module 122 is configured to take advantage of this to compute the attribute affinity scores 212, rather than multiply the matrices of this example as discussed just above. Instead of multiplying the first and second elemental matrices U and V, and then multiplying the result by the item-attribute matrix 208, I, to produce a product of (U×V)× I, for instance, the affinity module first multiplies the second elemental matrix V by the item-attribute matrix 208, I. The affinity module 122 then multiplies this product by the first elemental matrix U, such that U×(V×I). The affinity module 122 then determines the attribute affinity scores 212 by computing an LLR with the product of U×(V×I). By computing the attribute affinity scores 212 in this way, a computing cost to the affinity module 122 may be proportional to the following expression:

$$C_{R1\ Mult} = (k \times N \times A) + (M \times k \times A) = k \times A \times (M+N)$$

Here, the term $C_{R1\ Mult}$ represents the computational cost of using the completed ratings matrix R1 to compute the attribute affinity scores 212, though computed according to the just described order to take advantage of matrix multiplication being associative. The product of k×N×A represents a computing cost of the affinity module 122 to multiply the second elemental matrix V by the item-attribute matrix 208. Additionally, the product of k×N×A represents a computing cost of the affinity module 122 to determine the final result, e.g., the attribute affinity scores 212.

Having described example procedures in accordance with one or more implementations, consider now an example system and device that can be utilized to implement the various techniques described herein.

Example System and Device

Figure 7:
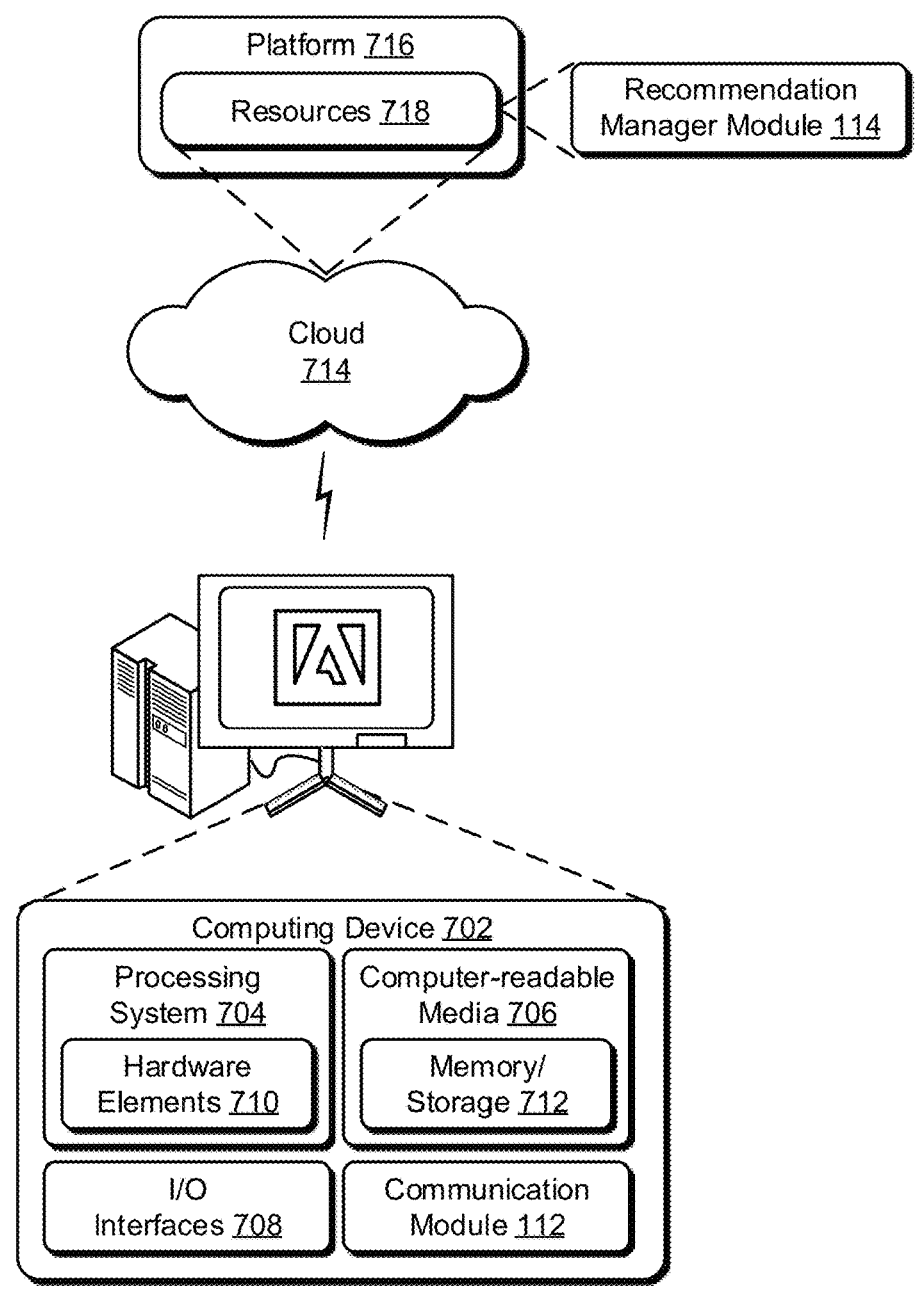
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the recommendation manager module 114 and the communication module 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media.

The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to provide digital content recommendations to client device users, a method implemented by a computing device, the method comprising:

determining, by the computing device, user affinity scores for a plurality of attributes of digital content, the user affinity scores determined based on a completed user-item matrix and an item-attribute matrix, the completed user-item matrix augmenting a sparse user-item matrix having cells that indicate strength-of-interaction measures of a client device user of the client device users with digital content items of a catalog of digital content items, the strength-of-interaction measures obtained from interaction data of the client device user that describes interactions of the client device user with the digital content items of the catalog of digital content items, the completed user-item matrix having additional cells that indicate predicted strength-of-interaction measures for the client device user obtained from additional interaction data describing interactions of an additional client device user with additional digital content items, the additional client device user determined similar to the client device user and the client device user has not consumed the additional digital content items;

identifying, by the computing device and from the catalog of digital content items, a first set of digital content items associated with a first attribute of the plurality of attributes using the completed user-item matrix instead of the sparse user-item matrix, the first set of digital content items identified based on detecting an association between the first attribute and metadata included in the first set of digital content items;

ranking, by the computing device, the first set of digital content items based on the user affinity scores and additional associations detected between the plurality of attributes and the metadata;

selecting, by the computing device, a subset of the first set of digital content items based on the ranking, the subset of digital content items including at least one digital content item that has not been consumed by the client device users;

generating, by the computing device, at least one recommendation for the subset of digital content items; and providing, by the computing device via a network, the at least one recommendation to a client device.

2. A method as described in claim 1, further comprising:
generating a justification associated with the at least one recommendation based on the first attribute; and
providing the justification with the at least one recommendation.

3. A method as described in claim 1, wherein the at least one recommendation is provided to the client device substantially in real time after a request for recommendations is received.

4. A method as described in claim 1, wherein the first attribute is a highest scoring of the plurality of attributes according to the user affinity scores.

5. A method as described in claim 1, further comprising performing the identifying, ranking, selecting, and generating for at least one other attribute of the plurality of attributes to recommend a second set of digital content items associated with the at least one other attribute.

6. A method as described in claim 5, further comprising receiving a request from the client device for recommendations, the request indicating a number of attributes for which to perform the identifying, ranking, selecting, and generating.

7. A method as described in claim 1, wherein a number of digital content items selected for the subset is based on a request from the client device for the at least one recommendation, the request indicating the number of digital content items to select for the subset.

8. A method as described in claim 1, wherein determining the user affinity scores includes:
generating the completed user-item matrix; and
generating the item-attribute matrix having cells that indicate associations between the plurality of attributes and the digital content items of the catalog.

9. A method as described in claim 1, wherein determining the user affinity scores further includes:
multiplying the completed user-item matrix and the item-attribute matrix; and
applying a Log-Likelihood Ratio to the multiplied matrices to compute the user affinity scores.

10. A method as described in claim 1, further comprising:
determining a latent factor vector for the client device user of the client device users based on the user affinity scores; and
extracting latent factor vectors for the first set of digital content items from the completed user-item matrix using a matrix factorization algorithm.

11. A method as described in claim 10, further comprising computing dot products of the latent factor vector of the client device user and the latent factor vectors of the first set of digital content items.

12. A method as described in claim 11, wherein the ranking is based on the dot products.

13. A system comprising:
an affinity module implemented at least partially in hardware of at least one computing device to determine user affinity scores for a plurality of attributes of digital content, the user affinity scores determined based on a completed user-item matrix and an item-attribute matrix, the completed user-item matrix augmenting a sparse user-item matrix having cells that indicate strength-of-interaction measures of a client device user of client device users with digital content items of a catalog, the strength-of-interaction measures obtained from interaction data of the client device user that describes interactions of the client device user with the digital content items of the catalog, the completed user-item matrix having additional cells that indicate predicted strength-of-interaction measures for the client device user obtained from additional interaction data describing interaction of an additional client device user with additional digital content items, the additional client device user determined similar to the client device user and the client device user has not consumed the additional digital content items;

a collaborative filtering module implemented at least partially in the hardware of the at least one computing device to filter the digital content items of the catalog for recommendation by:
identifying a first set of the digital content items that are associated with a first attribute of the plurality of attributes using the completed user-item matrix instead of the sparse user-item matrix, the first attribute used for the identifying being based on the user affinity scores;
ranking the first set of digital content items based on the user affinity scores and associations of the first set of digital content items with the plurality of attributes; and
selecting a subset of digital content items from the first set of digital content items based on the ranking to form at least one recommendation for the subset of digital content items, the subset of digital content items including at least one digital content item that has not been consumed by the client device users.

14. A system as described in claim 13, wherein the collaborative filtering module is further configured to filter the digital content items by identifying at least a second set of the digital content items that are associated with at least one other attribute of the plurality of attributes, and performing the ranking and selecting in relation to the at least second set of digital content items.

15. A system as described in claim 13, wherein the first attribute corresponds to a highest scoring of the plurality of attributes according to the user affinity scores.

16. A system as described in claim 13, wherein the collaborative filtering module is further configured to generate a justification associated with the at least one recommendation based on the first attribute.

17. A system as described in claim 13, further comprising:
a matrix generation module implemented at least partially in the hardware of the at least one computing device to:
generate the completed user-item matrix; and
generate the item-attribute matrix having cells that indicate detected associations between the plurality of attributes and the digital content items of the catalog; and
a user-attribute scoring module implemented at least partially in the hardware of the at least one computing device to determine the user affinity scores by:

multiplying the completed user-item matrix and the item-attribute matrix; and applying a Log-Likelihood Ratio to the multiplied matrices to compute the user affinity scores.

18. In a digital medium environment to provide digital content recommendations to client device users, a method implemented by a computing device, the method comprising:

generating, by the computing device, a completed user-item matrix, the completed user-item matrix augmenting a sparse user-item matrix having cells that indicate strength-of-interaction measures of a client device user with a catalog of digital content items, the completed user-item matrix having additional cells that indicate predicted strength-of-interaction measures for the client device user obtained from interaction data describing interactions of an additional client device user with additional digital content items, the additional client device user determined similar to the client device user and the client device user has not consumed the additional digital content items;

generating, by the computing device, an item-attribute matrix having cells that indicate associations of digital content items of the catalog with a plurality of attributes of digital content;

computing, by the computing device, user affinity scores based on the completed user-item matrix instead of the sparse user-item matrix and the item-attribute matrix;

identifying, by the computing device and from the catalog, a first set of digital content items associated with a first attribute of the plurality of attributes, the first attribute used for the identifying being based on the user affinity scores;

determining, by the computing device, a latent factor vector for the client device user based on the user affinity scores;

extracting, by the computing device, latent factor vectors for the first set of digital content items from the user-item matrix using matrix factorization;

computing, by the computing device, dot products of the latent factor vector of the client device user and the latent factor vectors of the first set of digital content items;

selecting, by the computing device, a subset of digital content items from the first set of digital content items based on the dot products, the subset of digital content items including at least one digital content item that has not been consumed by the client device users; and providing, by the computing device and to the client device via a network, at least one recommendation for the subset of digital content items.

19. A method as described in claim 18, further comprising ranking, by the computing device, the first set of digital content items based at least in part on the user affinity scores.

20. A method as described in claim 18, further comprising:

generating a justification associated with the at least one recommendation based on the first attribute; and providing the justification with the at least one recommendation.

* * * * *